US010586446B2

(12) United States Patent
Janovec et al.

(10) Patent No.: US 10,586,446 B2
(45) Date of Patent: Mar. 10, 2020

(54) SIGN TO VEHICLE IDENTIFICATION SYSTEM

(71) Applicant: 3M INNOVATIVE PROPERTIES COMPANY, St. Paul, MN (US)

(72) Inventors: Jeffrey D. Janovec, River Falls, WI (US); Kenneth L. Smith, White Bear Lake, MN (US); Michael R. Duoos, Lino Lakes, MN (US); Todd A. Ballen, St. Paul, MN (US); Travis L. Potts, Woodbury, MN (US); James Howard, Circle Pines, MN (US); Thomas J. Dahlin, Ironwood, MI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/442,728

(22) Filed: Jun. 17, 2019

(65) Prior Publication Data
US 2019/0304303 A1 Oct. 3, 2019

Related U.S. Application Data

(63) Continuation of application No. 15/540,891, filed as application No. PCT/US2015/067990 on Dec. 30, 2015, now Pat. No. 10,339,804.
(Continued)

(51) Int. Cl.
*G08G 1/0962* (2006.01)
*G06K 9/00* (2006.01)
(Continued)

(52) U.S. Cl.
CPC ..... *G08G 1/09623* (2013.01); *G06K 9/00818* (2013.01); *G08G 1/095* (2013.01);
(Continued)

(58) Field of Classification Search
CPC .. G08G 1/09623; G08G 1/095; G08G 1/0962; G08G 1/096716; G08G 1/096725;
(Continued)

(56) References Cited

U.S. PATENT DOCUMENTS

| | | | | |
|---|---|---|---|---|
| 1,591,572 A | * | 7/1926 | Stimson | C03B 11/06 264/1.9 |
| 3,190,178 A | * | 6/1965 | McKenzie | B44F 1/04 116/63 P |

(Continued)

FOREIGN PATENT DOCUMENTS

| | | |
|---|---|---|
| DE | 19756706 | 6/1999 |
| DE | 102012219106 | 5/2013 |

(Continued)

OTHER PUBLICATIONS

International Search Report for PCT International Application No. PCT/US2015/067990, dated Mar. 9, 2016, 5 pages.

*Primary Examiner* — Courtney D Heinle
(74) *Attorney, Agent, or Firm* — Jonathan L. Tolstedt

(57) ABSTRACT

Disclosed is an identification system to improve safety on roads and allow for the driver or for the vehicle itself, if it is autonomous or semi-autonomous, to have readable and useful information about road signs, roadways, and adjacent roadway information. The disclosed identification system comprises a marker with marker communication information that can be read by a vehicle information system to provide information to the vehicle. Information that the marker communication information may convey would allow the vehicle information system to detect or recognize, or both detect and recognize critical road sign, roadway information, and adjacent roadway information. Then, the vehicle information system could respond to the information received from the marker communication information.

19 Claims, 1 Drawing Sheet

Related U.S. Application Data

(60) Provisional application No. 62/098,140, filed on Dec. 30, 2014.

(51) Int. Cl.
*G08G 1/095* (2006.01)
*G08G 1/0967* (2006.01)

(52) U.S. Cl.
CPC ..... *G08G 1/0962* (2013.01); *G08G 1/096716* (2013.01); *G08G 1/096725* (2013.01); *G08G 1/096758* (2013.01); *G08G 1/096783* (2013.01)

(58) Field of Classification Search
CPC ....... G08G 1/096758; G08G 1/096783; G06K 9/00818
See application file for complete search history.

(56) References Cited

U.S. PATENT DOCUMENTS

| | | | | |
|---|---|---|---|---|
| 4,025,159 A * | 5/1977 | McGrath | G02B 5/128 | 359/514 |
| RE31,291 E * | 6/1983 | Eigenmann | E01F 9/578 | 404/14 |
| 4,588,258 A * | 5/1986 | Hoopman | G02B 5/124 | 359/530 |
| 4,775,219 A * | 10/1988 | Appeldorn | G02B 5/124 | 359/532 |
| 5,066,098 A * | 11/1991 | Kult | G02B 5/128 | 359/534 |
| 5,138,488 A * | 8/1992 | Szczech | G02B 5/122 | 359/529 |
| 5,450,235 A * | 9/1995 | Smith | B29C 39/148 | 359/529 |
| 5,831,551 A * | 11/1998 | Geduld | G01S 7/483 | 340/905 |
| 6,024,455 A * | 2/2000 | O'Neill | G02B 5/124 | 359/530 |
| 7,092,548 B2 * | 8/2006 | Laumeyer | G06K 9/00818 | 340/309 |
| 7,100,825 B2 * | 9/2006 | Levine | B60K 31/00 | 235/384 |
| 7,261,426 B2 * | 8/2007 | Smith | B29D 11/00605 | 359/530 |
| 8,036,427 B2 * | 10/2011 | Nakamori | G06K 9/00798 | 348/223.1 |
| 8,090,153 B2 * | 1/2012 | Schofield | G06K 9/00818 | 382/104 |
| 8,446,470 B2 * | 5/2013 | Lu | H04N 5/2258 | 348/148 |
| D687,088 S * | 7/2013 | Fleming | D18/24 | |
| 8,492,698 B2 * | 7/2013 | Schofield | G05D 1/0244 | 250/208.1 |
| 8,637,801 B2 | 1/2014 | Schofield | | |
| 2004/0073798 A1 * | 4/2004 | Look | B60R 13/10 | 713/175 |
| 2007/0005609 A1 * | 1/2007 | Breed | B60N 2/2863 | |
| 2007/0082963 A1 * | 4/2007 | Bhatt | B41M 3/14 | 522/6 |
| 2007/0131851 A1 * | 6/2007 | Holtz | G06K 9/00818 | 250/225 |
| 2007/0194950 A1 * | 8/2007 | Boss | G08G 1/0962 | 340/905 |
| 2007/0223996 A1 * | 9/2007 | Green | G08G 1/095 | 404/9 |
| 2008/0040029 A1 * | 2/2008 | Breed | B60N 2/2863 | 701/514 |
| 2010/0151213 A1 * | 6/2010 | Smithson | B60R 13/10 | 428/195.1 |
| 2010/0324775 A1 * | 12/2010 | Kermani | B60K 31/0058 | 701/31.4 |
| 2011/0216202 A1 * | 9/2011 | Natroshvili | G06K 9/00818 | 348/149 |
| 2011/0249867 A1 * | 10/2011 | Haas | G06K 9/00818 | 382/103 |
| 2012/0195470 A1 * | 8/2012 | Fleming | B60R 13/10 | 382/103 |
| 2012/0200709 A1 * | 8/2012 | Nakajima | G02B 5/128 | 348/148 |
| 2013/0034261 A1 * | 2/2013 | Perlin | G06K 9/00818 | 382/100 |
| 2013/0058534 A1 * | 3/2013 | Zobel | G06K 9/00818 | 382/103 |
| 2013/0077830 A1 * | 3/2013 | Liu | G06K 9/00818 | 382/104 |
| 2013/0113618 A1 * | 5/2013 | Flanagan | G08G 1/166 | 340/539.1 |
| 2013/0158796 A1 * | 6/2013 | Higgins-Luthman | B60Q 1/143 | 701/36 |
| 2013/0163865 A1 * | 6/2013 | Sato | G01C 21/3602 | 382/165 |
| 2013/0201334 A1 * | 8/2013 | C | G06K 9/00818 | 348/148 |
| 2013/0222175 A1 * | 8/2013 | Smith | G08G 1/09623 | 342/70 |
| 2013/0271292 A1 * | 10/2013 | McDermott | G08G 1/096783 | 340/905 |
| 2013/0272580 A1 * | 10/2013 | Karel | G08G 1/0175 | 382/105 |
| 2013/0314252 A1 * | 11/2013 | Rothschild | G08G 1/09623 | 340/905 |
| 2013/0314503 A1 * | 11/2013 | Nix | G06K 9/00805 | 348/46 |
| 2014/0063232 A1 * | 3/2014 | Fairfield | G06K 9/78 | 348/118 |
| 2014/0309810 A1 * | 10/2014 | Serex | G08G 1/0962 | 701/2 |
| 2017/0018179 A1 * | 1/2017 | Gutierrez | H04L 67/12 | |

FOREIGN PATENT DOCUMENTS

| | | |
|---|---|---|
| EP | 0982699 | 3/2000 |
| EP | 2026313 | 2/2009 |
| EP | 2048597 | 4/2009 |
| EP | 2575077 | 4/2013 |
| GB | 2358506 | 7/2001 |
| NL | 1008350 | 8/1999 |
| WO | WO 1995-17692 | 6/1995 |
| WO | WO 2011-094024 | 8/2011 |
| WO | WO 2013-017125 | 2/2013 |
| WO | WO 2013-113421 | 8/2013 |

* cited by examiner

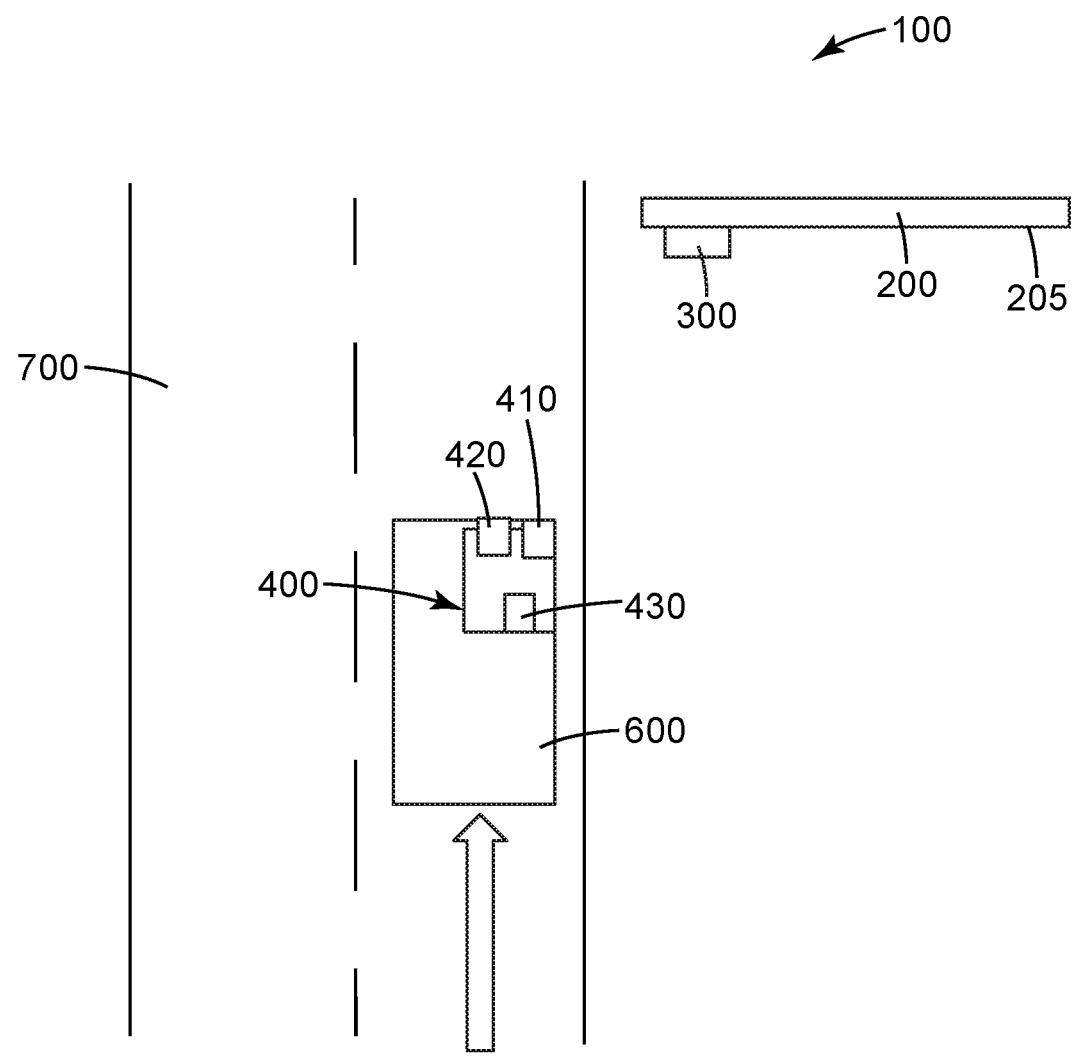

SIGN TO VEHICLE IDENTIFICATION SYSTEM

FIELD

The present disclosure relates to an identification system. In particular, the present disclosure relates to an identification system for use with a vehicle that comprises a marker that can assist in sign detection or sign recognition or both.

BACKGROUND

Road signs vary in size, shape, images, and words to communicate to a driver. For example, many signs have similar perimeter shapes yet convey different messages or images. Images on a sign, like an arrow, can convey different meanings depending on the other features on the sign. For example, a sign with an arrow might indicate a "one way" road, while another similar-sized and colored sign with an arrow might indicate the direction to a destination. Critical road signs, whose function is to provide important information for safe vehicle operation, can be difficult to identify and differentiate from the broader range of signs with similar shapes.

The electronic and communication capabilities available could aid in identification and communication between the road sign and a vehicle. Camera-based vision systems in particular are becoming common in new vehicles. However, current vision systems typically have difficulty accurately reading the broad range of highway road signs. For example, as discussed, a reader might identify the arrow, but not accurately distinguish the context of identifying whether the arrow might indicate a "one way" sign or a direction to a destination. There is a need for an improved identification system to more accurately detect or recognize, or both detect and recognize critical road signs, roadway information, and adjacent roadway information.

SUMMARY

Disclosed is an identification system to improve safety on roads and allow for the driver or for the vehicle itself (if it is autonomous or semi-autonomous) to have readable and useful information about road signs, roadways, and adjacent roadway information. The disclosed identification system comprises a marker with marker communication information that can be read by a vehicle information system to provide information to the vehicle. Information that the marker communication information may convey would allow the vehicle information system to detect or recognize, or both detect and recognize critical road sign, roadway information, and adjacent roadway information. Then, the vehicle information system could respond to the information received from the marker communication information.

In one embodiment, an identification system comprises a marker with marker communication information, a vehicle information system on a vehicle comprising a reader to read the marker communication information and a processor to convert the marker communication information into output information.

In one embodiment, a marker for sending information to a vehicle comprises marker communication information that is static information transmitted to a reader and processor on a vehicle information system of the vehicle that is capable of converting the marker communication information into output information.

In one embodiment, a vehicle information system comprises a reader and a processor. The reader is capable of receiving marker communication information from a marker. The processor is capable of converting the marker communication information into output information.

In one embodiment, an identification system between a sign and a vehicle comprises a sign with sign communication information, a marker at a predetermined location relative to the sign, wherein the marker comprises marker communication information comprising optical communication, a vehicle information system comprising a light source to send light to the marker, a reader to read the optical communication, and a processor to convert the optical communication into output information. The optical communication of the marker is retroreflected light from the light source. The output information is at least one of a detection of the presence of the sign or a recognition of the sign communication information.

In one embodiment, a marker for a sign having sign communication information comprises a retroreflective sheet, and marker communication information that comprises optical communication that is reflected light from the retroreflective sheet. The marker is at a predetermined location relative to the sign. The marker communication information communicates information about the location of the sign and about the sign communication information.

In general, sign communication information may be any text or graphic or combination thereof intended to provide information to a road user. Optical communication comprises communication based on patterns (for example, machine-readable text, graphics, indicia, patterns, shape, or a code, such as a bar code or QR code) read using visible or non-visible wavelengths as well as communication based on variations or patterns in properties such as frequency, wavelength, polarization or amplitude including pulsed amplitude.

In any one of the described embodiments, the identification system further comprises any one of:
a sign with sign communication information.
 the output information is at least one of a detection of the presence of the sign or a recognition of the sign communication information.
 the marker is at a predetermined location relative to the sign.
 the marker is attached to the sign.
 the marker is adhesively mounted to the sign.
 the marker is embedded within the sign.
 the marker is separate from the sign and preceding the sign, relative to the direction of a moving vehicle.
 the output information is a distance to the sign.
 the marker communication information is static information.
 the static information is a code.
 the static information is an optical image.
 the static information is an electronic signal.
 the marker comprises a passive communication device.
 a light source for sending light to the marker.
 the marker communication information comprises optical communication.
 the marker communication information comprises retroreflected light.
 the marker communication information comprises reflected light at a specific wavelength.
 the marker communication information comprises IR or near-IR light.
 the marker comprises retroreflective film.

the retroreflective film reflects the light from the light source at a specific angle with respect to the reader.

the marker comprises multi-layer optical film.

the multi-layer optical film reflects one or more specific wavelengths of the light source away from the reader.

the multi-layer optical film reflects IR or near-IR wavelengths of the light source away from the reader.

the multi-layer optical film includes a code.

the code is a bar code or QR code.

the marker comprises a wavelength-specific ink viewable by the reader.

the marker comprises an active communication device having an energy source.

the marker communication information comprises an electronic signal.

the electronic signal comprise one of a pulsed light emitting diode signal, auditory signal, radio signal.

the marker communication information comprises position information.

the vehicle information system further comprises a light source.

the light source emits light in a specific range of wavelengths.

the specific range of wavelengths of light emitted from the light source is outside the range of wavelengths visible by the human eye.

the specific range of wavelengths of light emitted from the light source is near-infrared (IR).

the marker comprises a predetermined shape, color, or retroreflective property.

the marker comprises a predetermined retroreflective divergence profile or change in polarization of the retroreflected light.

the vehicle information system identifies the marker from receiving marker communication information.

the reader receives the marker communication information in a specific range of wavelengths.

the specific range of wavelengths of the marker communication information is outside of the range of wavelengths visible by the human eye.

the specific range of wavelengths of the marker communication information is infrared (IR) or near-infrared (IR).

the reader of the vehicle information system comprises a lens to receive the marker communication information.

the reader of the vehicle information system comprises a camera with a lens to receive the marker communication information.

the reader of the vehicle information system receives the electronic signal from the marker.

the reader of the vehicle information system receives the auditory signal.

the reader of the vehicle information system receives the radio signal.

the reader of the vehicle information system receives the signal from the light source.

the reader of the vehicle information system receives the optical communication which is at least partially retroreflected light from the light source.

the processor communicates with an internet-based information storage system.

the internet-based information storage system receives marker communication information and provides comprehensive information to the processor.

comprehensive information comprises sign communication information, geographic placement information, weather information, traffic information, local business information, news information, or adjacently-located fixtures.

adjacently-located fixtures are selected from the group consisting of vehicles, restaurants, business locations.

the marker communication contains information about the sign communication.

the output information is used to control an operation of the vehicle.

the output information is a detection of the presence of the sign and a recognition of the sign communication information.

BRIEF DESCRIPTION OF THE DRAWINGS

FIG. 1 is a top view of one embodiment of an identification system.

While the above-identified drawings and FIGURES set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The FIGURES may not be drawn to scale.

DETAILED DESCRIPTION

The identification system 100 comprises a marker 300 that includes marker communication information that can be read by a vehicle information system. FIG. 1 is a top view of a roadway 700 with a vehicle 600 driving in the direction of the arrow. Adjacent to the roadway is a marker 300 that includes marker communication information. Also, shown in FIG. 1 is a sign 200 which contains sign communication information, such as "STOP" or an arrow to turn right. In one embodiment, the marker communication information may communicate information about the sign communication information. In one embodiment, the marker communication information may communicate information about critical road signs, roadway information, and adjacent roadway information. On the vehicle 600 is a vehicle information system 400 for reading and processing the marker communications information.

It would be costly and time consuming to completely redesign existing road signs to include information that would be more easily read by a reader on a vehicle. Therefore, the identification system 100 disclosed includes a marker 300, which discretely contains marker communication information. In one embodiment, the marker 300 may be attached to a sign 200 or to the post holding the sign. For example, the marker 300 could be attached during the original construction of the sign 200, or may be separately attached to a finished, already existing sign 200. If attached during the original construction of the sign 200, the marker 300 could be embedded within the sign 200. If attached to a finished sign 200, the marker 300 could be adhesively secured to the sign 200. If the identification system 100 relies on optical identification of the marker communication information of the marker 300, then the marker 300 is attached to the viewable surface or viewable portion of the sign 200.

In one embodiment, the marker 300 is not attached or connected to any portion of the sign 200. Instead, the marker 300 is located near the road 700. If the identification system 100 relies on optical identification of the marker communication information of the marker 300, then the marker 300 is placed near the road 700 in a viewable location. The marker 300 itself may appear like a sign. The marker 300 may be secured on its own post, to other road way fixtures, adjacent fixtures, or buried underground.

To provide additional data to the vehicle information system 400, in one embodiment, the marker 300 is at a predetermined location relative to a sign 200. In one embodiment, the marker 300 is located on the sign. Typically, when the marker 300 is separate from the sign 200, the marker 300 will preceding the sign 200, relative to the direction of a moving vehicle, such as shown in FIG. 1. The marker 300 may also be displaced from the sign 200 but located on the sign post or other supporting structure. When the marker 300 is at a predetermined location relative to a sign 200, such as a stop sign, the vehicle information system 400 can use the location information of the marker 300 relative to the sign 200 along with any other inputs to calculate such things as the time to stop before the sign, or the direction the car must turn after the sign.

The marker 300 comprises marker communication information. Marker communication information is information that the marker 300 communicates to the vehicle information system 400 which reads and processes the marker communication information (the details of the vehicle information system 400 are described below).

In one embodiment, the marker 300 further comprises a passive communication device. A passive communication device is a device that contains marker communication information that can be read, and the marker communication information does not change. Therefore, in such an embodiment, the marker communication information comprises static information, which is information that does not change. In one embodiment, the static information comprises an optical communication such as, for example, machine-readable text, graphics, indicia, patterns, shape, or a code, such as a bar code or QR code.

Depending on the marker functionality, the marker 300 may require a power source, which may be provided from such elements as a battery, solar panel, or electrical connection. To limit power consumption or the need required to monitor and change batteries, a preferred marker 300 functions without an external power source.

In embodiments where the marker communication information comprises an optical communication, the optical communication may be reflected light from a source which illuminates the marker. To reflect light, the marker 300 may comprise reflective and/or retroreflective materials. The term "reflective" as used herein refers to the attribute of reflecting an obliquely incident light ray at an equal angle measured with respect to the surface normal of the marker wherein the incident and reflected rays and the surface normal are coplanar (also called specular reflection). The term "retroreflective" as used herein refers to the attribute of reflecting an obliquely incident light ray in a direction antiparallel to its incident direction, or nearly so, such that it returns to the light source or the immediate vicinity thereof. The incident direction is typically angularly displaced from the surface normal of the sign or marker by the entrance angle. Preferably the return light is angularly displaced from its incident direction by the observation angle so that it can be read by a detector which is displaced from the source (e.g the human eye which is displaced relative to the vehicle head light). Both entrance and observation angle vary as a function of vehicle position relative to a sign or marker. Two known types of retroreflective sheeting are microsphere-based sheeting and cube corner sheeting (often referred to as prismatic sheeting). Microsphere-based sheeting, often referred to as "beaded" sheeting, employs a multitude of microspheres typically at least partially embedded in a binder layer and having associated specular or diffuse reflecting materials (e.g., pigment particles, metal flakes, vapor coats) to retroreflect incident light. Illustrative examples are described in, for example, U.S. Pat. No. 3,190,178 (McKenzie), U.S. Pat. No. 4,025,159 (McGrath), and U.S. Pat. No. 5,066,098 (Kult). Cube corner retroreflective sheeting, often referred to as "prismatic" sheeting, comprises a body portion typically having a substantially planar front surface and a structured rear surface comprising a plurality of cube corner elements. Each cube corner element comprises three approximately mutually perpendicular optical faces. Illustrative examples are described in, for example, U.S. Pat. No. 1,591,572 (Stimson), U.S. Pat. No. 4,588,258 (Hoopman), U.S. Pat. No. 4,775,219 (Appledorn et al.), U.S. Pat. No. 5,138,488 (Szczech), and U.S. Pat. No. 7,261,426 (Smith et al.). A seal layer may be applied to the structured surface to keep contaminants away from individual cube corners. Flexible cube corner sheetings, such as those described, for example, in U.S. Pat. No. 5,450,235 (Smith et al.) can also be incorporated in embodiments or implementations of the present application. Retroreflective sheeting for use in connection with the present application can be, for example, either matte or glossy.

The retroreflective film can be designed in a way to retroreflect light that sends a different optical communication as a function of, for example, entrance or observation angle. For example, a vehicle 600 that is 300 meters away from a retroreflective marker 300 might retroreflect light that provides a first optical signal to the vehicle information system 400, while the vehicle 600 that is 20 meters away from the retroreflective marker 300 might retroreflect light that provides a second optical signal to the vehicle information system 400. For example, for retroreflective film used as the marker 300, if the reader 420 is 0.35 meters from the light source 410 of the vehicle information system 400 then the observation angle is 0.1 degree at 200 meters and 1.0 degree at 20 meters.

In some embodiment, the reflected light of the marker communication information may be light at a specific wavelength. For example, the marker communication information may comprise IR or near-IR light. An IR or near-IR optical communication would not be significantly visible in the visible light spectrum, and therefore would not cause a visual distraction to the driver of the vehicle 600.

In embodiments where the marker communication information comprises optical communication that is light at a specific wavelength, the marker 300 may comprise a layer to control the reflected light. In one embodiment, the marker 300 comprises multi-layer optical film to control the reflected light. In one embodiment, the marker 300 comprises wavelength specific inks.

For example, the marker 300 may include permanent or temporary attachment of one or more visibly-transparent, near-infrared-reflecting multi-layer optical films to the retroreflective sheeting. Such attachment may occur by, for example, use of an adhesive. The use of areas of visibly-transparent, near-infrared-reflecting multi-layer optical films on the marker 300 causes specific wavelengths of light, such as near-infrared light, incident on the marker 300 to be reflected from the otherwise retroreflective light path and thus creates regions of high contrast compared to adjacent areas on the marker 300 without multi-layer optical films when viewed. The specific wavelengths are reflected away from the vehicle information system 400 that would read the marker communication information. Multi-layer optical films are effectively wavelength-specific reflecting mirrors with high transmission in the different wavelength regions such as the visible portion of the wavelength spectrum. Meanwhile, the image/graphics/indicia/pattern on the marker 300 remains largely unaffected by the presence of the multi-layer optical film(s) when viewed with visible light. Because the visibly-transparent, wavelength-specific reflecting multi-layer optical film(s) are not significantly visible in the visible portion of the wavelength spectrum, the image/graphics/indicia/pattern created using the multi-layer optical film(s) is not visible to the human eye in the visible portion of the wavelength spectrum and does not cause a visual distraction to the driver.

The multi-layer optical film chosen for any specific implementation will depend on the desired optical, structural, and durability characteristics. As such, desirable multi-layer optical films will vary based on the intended application. Some exemplary multi-layer optical films are described in, for example, U.S. Pat. No. 6,024,455 and PCT Publication No. WO 95/17692. Exemplary commercially available multi-layer optical films include, for example, Vikuiti Clear Card Filter, Solar Reflective Film, and SM 857, all manufactured by 3M Company of St. Paul. The reflectance and transmission spectrum of a particular multi-layer optical film depends, in part, on the optical thickness of the individual layers along the various axes, and is substantially determined by the Fresnel coefficient. Films can be designed to reflect infrared, visible, or ultraviolet light by choice of the appropriate optical thicknesses. The desired relationship between refractive indices of polymeric layers can be achieved by selection of appropriate materials and appropriate processing conditions.

Alternatively or in combination, the wavelength-specific dye may be used to provide the marker communication information (for example, infra-red reflecting or absorbing dye). Exemplary descriptions of such dyes may be found in, for example, U.S. Publication No. 2007/0082963. Commercially-available infra-red reflecting dyes include, for example, those manufactured by H.W. Sands Corporation of Juniper, Fla. and Epolin Corporation of Newark, N.J. One exemplary advantage of multi-layer optical film usage, especially multi-layer optical films with high visible light transmission, is that unlike near-infrared absorbing dyes, tinting or color change can be largely avoided or minimized.

In one embodiment, the marker 300 further comprises an active communication device. An active communication device is a device that is able to read information and contains information that can be read. In active communication devices the information can be altered under certain circumstances. In active communication devices the marker communication comprises dynamic information. In one embodiment, the marker communication information is dynamic information that comprises one or more of an optical signal, audio signal, electronic signal, radio signal. In one embodiment, the electronic signal is a pulsed light emitting diode signal. In an active communication device, in one embodiment, the marker communication is position or location service information which might augment, for example, vehicle-based GPS position information. Typically, an active communication device will have an energy source, such as a battery.

In one embodiment, the marker 300 comprises one or more materials or devices for providing marker communication information. In one embodiment, the marker 300 comprises both a passive communication device and an active communication device. In one embodiment, both static information and dynamic information are provided as marker communication information from the marker 300 to the vehicle information system 400.

The vehicle information system 400 comprises a reader 420 and a processor 430. The reader is any kind of device able to detect the marker communication information. The processor is any kind of device that is able to convert the marker communication information into output information. The specific aspects of the reader 420 will be determined based on the format of the marker communication information. In one embodiment, the reader 420 is able to receive one or more of an optical signal, electronic signal, auditory signal, radio frequency signal, or internet-based signal from the marker 300.

For the vehicle information system 400 to read the marker communication information, the vehicle information system 400 first needs to identify the marker 300. In one embodiment, the marker 300 comprises a predetermined shape, predetermined color, or predetermined retroreflective property comprising a specific retroreflective divergence profile or change in polarization of the retroreflected light that the reader 420 and processor 430 are designed to recognize. Predetermined color may include non-visible light wavelengths. In one embodiment, the vehicle information system 400 identifies the marker 300 from the information it receives by reading and processing the marker communication information. In one embodiment, the vehicle information system 400 identifies the marker 300 by matching with image or character recognitions software the predetermined property, such as shape, color, or retroreflective properties, of the marker 300.

In one embodiment, the reader 420 of the vehicle information system 400 comprises a camera to receive the marker communication information. In one embodiment, the reader 420 of the vehicle information system 400 comprises a camera with a lens to receive the marker communication information. In one embodiment, the reader 420 of the vehicle information system 400 comprises a camera with a lens and a wavelength-sensitive filter to receive the marker communication information. In one embodiment, reader 420 receives the marker communication information in a specific range of wavelengths that may be outside of the range of wavelengths visible by the human eye. In one embodiment, the specific range of wavelengths of the marker communication information received by the reader 420 is infrared (IR) or near-infrared (IR).

The reader 420 will match the functionality of the marker communication information of the marker 300. For example: if the marker communication information is optical communication, the reader 420 will comprise a camera and lens; if the marker communication information is optical communication within a specific wavelength range, the reader 420 will comprise a wavelength-specific camera and lens; if the marker communication information is a radio signal, the reader 420 will comprise a radio reader; if the marker communication information is an RFID signal, the reader 420 will comprise an RFID reader. It is understood that the marker communication information can comprise one or more types of information and therefore the reader 420 might have one or more capabilities for reading the marker communication information.

For marker communication information that is optical communication, ambient light may be used as the light source to provide the reflected light to the reader 420. However, typically the vehicle information system 400 includes a light source 410 for directing light to the marker 300 to take particular advantage of retroreflective properties of the marker. In one embodiment, the light source 410 emits light to the marker 300. In one embodiment, the light source 410 emits light to the marker 300 in a specific range of wavelengths. In one embodiment, the specific range of wavelengths of light emitted from the light source 410 is outside the range of wavelengths visible by the human eye. In one embodiment, the specific range of wavelengths of light emitted from the light source is near-infrared (IR).

The vehicle information system 400 includes a processor 430 for interpreting the marker communication information received by the reader 420 and converting it to output information. The processor 430 comprises common computer processor components such as a memory. In one embodiment, the processor 430 comprises software code for interpreting the marker communication information. In one embodiment, the processor 430 comprises pattern recognition or optical character recognition software. The processor 430 may control a transmitter and receiver and be able to send and receive information, such as the output information, from the vehicle information system 400 to external devices. For example, the processor 430 may send the output information to an internet-based information storage system, which in turn sends comprehensive information back to the processor 430 regarding the output information.

The vehicle information system 400 receives the marker communication information from the marker 300 to the vehicle 600. In one embodiment, the vehicle 600 comprises the vehicle information system 400 that reads the marker communication information and processes the marker communication into output information. The processed output information may provide visual or audio information to the driver or may control a function of the vehicle 600.

In some embodiment, information may be received to the vehicle information system 400, such a GPS or other positional information, that will make certain received marker communication information irrelevant. For example, information about the lane that a car is traveling in can make some road signs more or less relevant. For example, if a car is traveling in a center lane, then an "Exit Only" sign is not relevant and the vehicle information system may be programmed to disregard that marker communication information.

In one embodiment, the vehicle information system 400 includes a transmitting source, such as a light source 410, that first sends a signal, such as light, audio, electrical, or radio, to the marker 300. Then, the vehicle information system 400 reads the returned marker communication information and processes the marker communication into output information.

The marker 300 functions to send marker communication information from the marker 300 to the vehicle 600. In one embodiment, the marker 300 sends one or more of optical communications, an audio signal, an electrical signal, a radio signal, an internet-based signal that is capable of being read by the reader 420 of the vehicle information system 400 and processed into output information that provides visual or audio information to the driver or may control a function of the vehicle 600. In one embodiment, the marker 300 receives a signal, such as light, audio, electrical, radio, internet-based, from the vehicle information system 400. Then the marker 300 returns marker communication information to the vehicle information system 400.

The marker communication information may provide information to the vehicle information system 400 about sign communication information, other adjacent critical road signs, roadway information, or adjacent roadway information.

In one embodiment, the output information is matched from stored information in the vehicle information system 400 such that a function is applied by the processor 430. For example, marker communication information may provide information that there is a "stop" sign 100 meters ahead. The processor 430 could match to any number of functions, such as an audio message to the driver that says "Stop Ahead" or the processor 430 could control braking of the vehicle 600.

In one embodiment, the output information is sent to an internet-based information storage system. Based on the information sent, the internet-based information storage system may send back to the processor 430 in the vehicle information system 400 comprehensive information that may include the local weather, local traffic conditions, adjacently-located fixtures (such as vehicles, houses, restaurants or businesses), and upcoming road signs. For example, the marker communication information may be a code that is deciphered and which includes a fixed IP address or URL to the internet-based storage system. The processor 430 may communicate this comprehensive information to the driver of the vehicle 600. The processor 430 may use this comprehensive information to control aspects of the vehicle 600. For example, if the marker communication information is an optical communication that is read by a camera in the vehicle information system 400, the processor may process that optical communication into output information that is location information and send that output information to an internet-based information storage system. Based on the location information the internet based information storage system may send back to the processor 430 in the vehicle information system 400 comprehensive information that may include the local weather, local traffic conditions, adjacently located fixtures (such as vehicles, houses, restaurants or businesses), and upcoming road signs. The processor 430 may communicate this comprehensive information to the driver of the vehicle 600. The processor 430 may use this comprehensive information to control aspects of the vehicle 600. For example, if the comprehensive information received to the processor 430 from the internet based information storage system indicated there is a stop sign in 100 meters, then the processor 430 could control braking of the vehicle 600.

The processor 430 may also receive positional information to identify a particular marker such that the marker communication information received from a particular marker can be connected to certain information from the internet based information storage system. For example, if marker communication information is received at a known location that is information related to a nearby hotel, that marker communication information could be updated to include vacancy information about the hotel. For example, if marker communication information is received about a constructions zone, new changes, cautionary messages, or detours can be communicated for that location.

Although specific embodiments of this invention have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. Thus, the scope of the present invention should not be limited to the structures described in this application, but only by the structures described by the language of the claims and the equivalents of those structures.

What is claimed is:

1. A system comprising:
a receiver device configured to receive marker information from a marker, wherein the marker is positioned at a location of a roadway; and
a processor configured to:
   determine positional information related to at least one of a position of a vehicle or the location of the marker at the roadway;
   generate output information based on at least one of the marker information or the positional information related to at least one of a position of a vehicle or the location of the marker at the roadway;
   send, to a remote computing device, the output information that is based on the marker information and the positional information related to at least one of the position of the vehicle or the location of the marker at the roadway;
   receive additional information relating to the output information; and
   in response to determining that the marker information is relevant to the vehicle, perform at least one operation that corresponds to a function of the vehicle based at least in part on the additional information that relates to the output information.

2. The system of claim 1, wherein the output information comprises at least one of: visual information to be provided to a driver of a vehicle; audio information to be provided to the driver of the vehicle; control of a function of the vehicle; sign communication information that is readable to a user; a distance to the sign; a uniform resource locator (URL); an Internet Protocol (IP) address code; or information received from an internet-based information storage system.

3. The system of claim 1, wherein the marker is attached to a roadway sign.

4. The system of claim 1, wherein the marker is separate from a roadway sign and positioned to precede the roadway sign, relative to a direction that the vehicle is moving.

5. The system of claim 1, wherein the marker information comprises at least one of machine-readable text, a graphic, an indicia, a pattern, a shape, a retroreflective property, or a code.

6. The system of claim 1, wherein the marker further comprises at least one of an active communication device comprising an energy source or a passive communication device without an energy source.

7. The system of claim 1, wherein the marker is configured to emit a signal comprising the marker information, and wherein the signal comprises at least one of a light-based signal, an audio signal, or an electronic signal.

8. A computing device comprising:
a memory; and
one or more computer processors configured to:
   receive, from a receiver device, marker information from a marker, wherein the marker is positioned at a location of a roadway;
   determine positional information related to at least one of a position of a vehicle or the location of the marker at the roadway;
   generate output information based on at least one of the marker information or the positional information related to at least one of a position of a vehicle or the location of the marker at the roadway;
   send, to a remote computing device, the output information that is based on the marker information and the positional information related to at least one of the position of the vehicle or the location of the marker at the roadway;
   receive additional information relating to the output information; and
   in response to determining that the marker information is relevant to the vehicle, perform at least one operation that corresponds to a function of the vehicle based at least in part on the additional information that relates to the output information.

9. The computing device of claim 8, wherein the output information comprises at least one of: visual information to be provided to a driver of a vehicle; audio information to be provided to the driver of the vehicle; control of a function of the vehicle; sign communication information that is readable to a user; a distance to the sign; a uniform resource locator (URL); an Internet Protocol (IP) address code; or information received from an internet-based information storage system.

10. The computing device of claim 8, wherein the marker is attached to a roadway sign.

11. The computing device of claim 8, wherein the marker is separate from a roadway sign and positioned to precede the roadway sign, relative to a direction that the vehicle is moving.

12. The computing device of claim 8, wherein the marker information comprises at least one of machine-readable text, a graphic, an indicia, a pattern, a shape, a retroreflective property, or a code.

13. The computing device of claim 8, wherein the marker further comprises at least one of an active communication device comprising an energy source or a passive communication device without an energy source.

14. The computing device of claim 8, wherein the marker is configured to emit a signal comprising the marker information, and wherein the signal comprises at least one of a light-based signal, an audio signal, or an electronic signal.

15. A marker constructed of physical material and configured to be positioned at a location of a roadway, the marker comprising:
marker information configured in the marker;
position information configured in the marking information; and
wherein the marker is configured to provide a signal comprising the marker information that causes a computing device of a vehicle to determine positional information related to at least one of a position of a vehicle or the location of the marker at the roadway; generate output information based on the marker information and the positional information related to at least one of a position of a vehicle or the location of the marker at the roadway; send, to a remote computing device, the output information that is based on the marker information and the positional information related to at least one of the position of the vehicle or the location of the marker at the roadway; receive additional information relating to the output information; and in response to determining that the marker information is relevant to the vehicle, perform at least one operation that corresponds to a function of the vehicle based at least in part on the additional information that relates to the output information.

16. The marker of claim 15, wherein the output information comprises at least one of: visual information to be provided to a driver of a vehicle; audio information to be provided to the driver of the vehicle; control of a function of the vehicle; sign communication information that is readable to a user; a distance to the sign; a uniform resource locator (URL); an Internet Protocol (IP) address code; or information received from an internet-based information storage system.

17. The marker of claim 15, wherein the marker is attached to a roadway sign.

18. The marker of claim 15, wherein the marker information comprises at least one of machine-readable text, a graphic, an indicia, a pattern, a shape, a retroreflective property, or a code.

19. The marker of claim 15, wherein the marker is configured to emit a signal comprising the marker information, and wherein the signal comprises at least one of a light-based signal, an audio signal, or an electronic signal.

* * * * *